US012286779B2

(12) United States Patent
Pormentilla

(10) Patent No.: US 12,286,779 B2
(45) Date of Patent: Apr. 29, 2025

(54) URINAL FLUSH ASSEMBLY

(71) Applicant: AS America, Inc., Piscataway, NJ (US)

(72) Inventor: Beda Angelo Pormentilla, Jersey City, NJ (US)

(73) Assignee: AS America, Inc., Piscataway, NJ (US)

( * ) Notice: Subject to any disclaimer, the term of this patent is extended or adjusted under 35 U.S.C. 154(b) by 61 days.

(21) Appl. No.: 17/912,155

(22) PCT Filed: Mar. 22, 2021

(86) PCT No.: PCT/US2021/023456

§ 371 (c)(1),
(2) Date: Sep. 16, 2022

(87) PCT Pub. No.: WO2021/194956

PCT Pub. Date: Sep. 30, 2021

(65) Prior Publication Data

US 2023/0140590 A1 May 4, 2023

Related U.S. Application Data

(60) Provisional application No. 62/993,240, filed on Mar. 23, 2020.

(51) Int. Cl.

| | |
|---|---|
| ***E03D 1/38*** | (2006.01) |
| ***B05B 1/04*** | (2006.01) |
| ***E03D 13/00*** | (2006.01) |

(52) U.S. Cl.

CPC ................ *E03D 1/38* (2013.01); *B05B 1/044* (2013.01); *E03D 13/00* (2013.01); *E03D 2201/40* (2013.01)

(58) Field of Classification Search

CPC ...................................................... E03D 13/00

See application file for complete search history.

(56) References Cited

U.S. PATENT DOCUMENTS

| | | | | |
|---|---|---|---|---|
| 2002/0152548 | A1* | 10/2002 | Harrison | E03D 1/32 4/366 |
| 2002/0162166 | A1 | 11/2002 | Saar et al. | |
| 2008/0052810 | A1* | 3/2008 | Zeeb | A47K 11/12 4/144.1 |
| 2009/0293187 | A1 | 12/2009 | Pessel et al. | |
| 2015/0026874 | A1* | 1/2015 | Bogard | E03D 13/00 4/301 |

FOREIGN PATENT DOCUMENTS

| | | | |
|---|---|---|---|
| CN | 203238757 | U | 10/2013 |
| DE | 1658261 | A1 | 3/1972 |
| DE | 102006031893 | A1 | 1/2008 |

OTHER PUBLICATIONS

PCT/US2021/023456 International Search Report and Written Opinion dated Jun. 8, 2021.

* cited by examiner

*Primary Examiner* — Lauren A Crane

(74) *Attorney, Agent, or Firm* — Rameshwar U. Patel; Tyler A. Stevenson; Anna-lisa L. Gallo

(57) ABSTRACT

A flush assembly for a plumbing fixture, the assembly comprising a sprayer body, wherein the sprayer body comprises a bottom wall, a front wall, and a rear wall, the sprayer body is configured to be in fluid communication with a water source, and the sprayer body bottom wall comprises a first outlet through which flush water is delivered during a flush cycle. The first outlet may comprise a slot shape and/or an arc slot shape. The flush assembly provides a large flush profile.

20 Claims, 3 Drawing Sheets

URINAL FLUSH ASSEMBLY

The disclosure is directed to a flush assembly for a plumbing fixture, the flush assembly configured to provide a highly efficient flush water flow profile during a flush cycle.

BACKGROUND

Urinals typically are coupled to a flush valve mounted above the fixture, the flush valve configured to control a volume of flush water delivered to the urinal during a flush (flush cycle). A flush valve inlet may be fluidly coupled to a municipal water supply, and a flush valve outlet may be fluidly coupled to a sprayer body or spreader. A sprayer body may be coupled to an upper portion of a fixture wall and configured to “wash down” urine into a basin of the fixture containing a drain coupled to a waste line.

There is a need for a sprayer body that delivers flush water to a plumbing fixture during a flush cycle, and to provide a highly efficient flush water flow profile, so that the fixture remains clean after many uses.

SUMMARY

Accordingly, disclosed is a flush assembly for a plumbing fixture, the assembly comprising a sprayer body, wherein the sprayer body comprises a bottom wall, a front wall, and a rear wall, the sprayer body is configured to be in fluid communication with a water source, and the sprayer body bottom wall comprises a first outlet through which flush water is delivered during a flush cycle.

In some embodiments, a sprayer body may comprise an arc shape. In certain embodiments, a first outlet comprises an arc shape corresponding to an arc shape of a sprayer body. In still other embodiments, a sprayer body bottom wall comprises a first outlet and a second outlet through which flush water is delivered during a flush cycle. First and second outlets may be positioned in a symmetric pattern along the bottom wall. In some embodiments, the sprayer body may comprise first, second, and third outlets through which flush water is delivered during a flush cycle. Second a third outlets may be positioned on opposing ends of the first outlet. First, second, and third outlets may be positioned in a symmetric pattern along the bottom wall.

These and other embodiments are more fully described below.

BRIEF DESCRIPTION OF THE DRAWINGS

The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

Figure 1A:
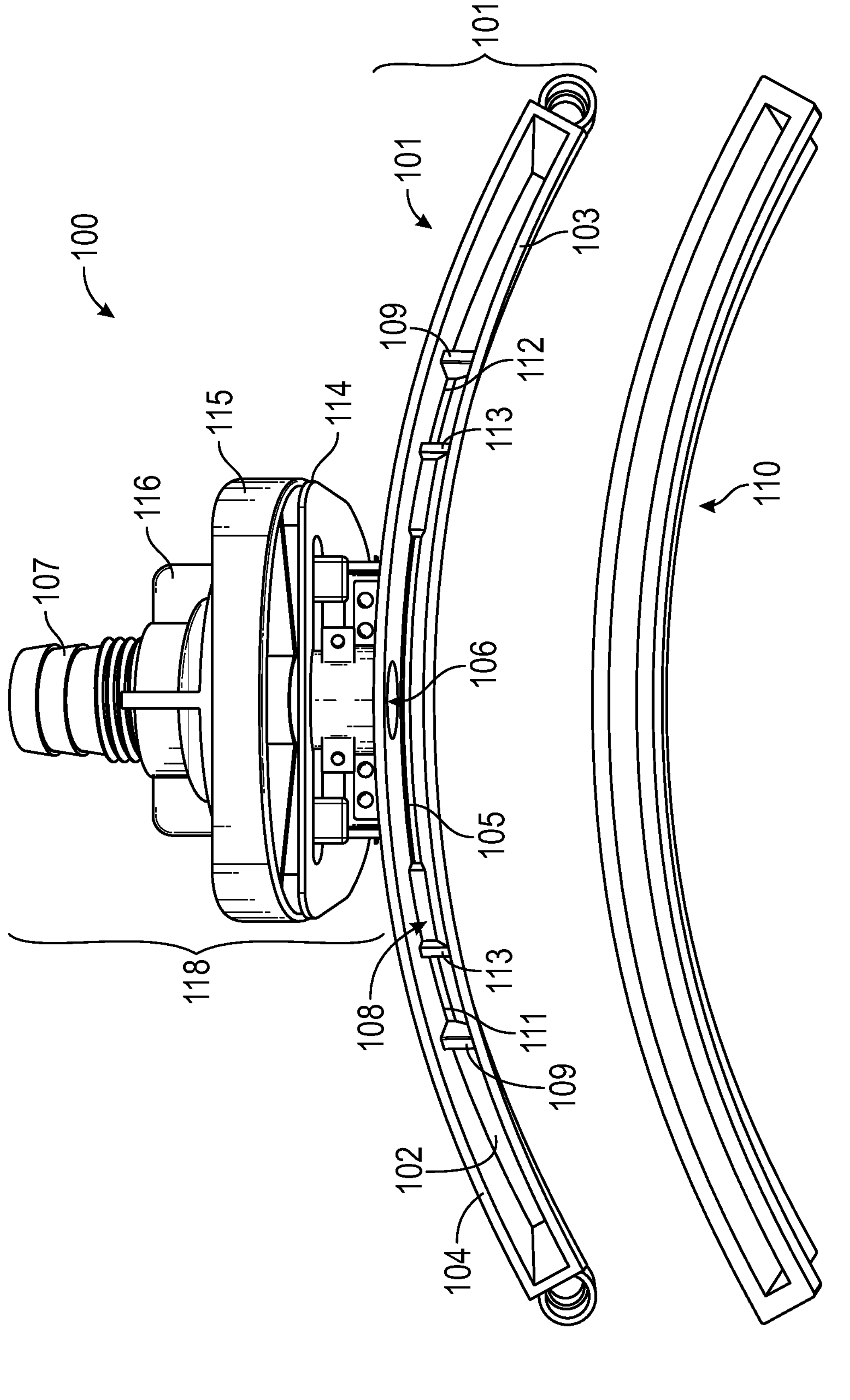
FIG. 1A shows an exploded view of a flush assembly, according to an embodiment.

FIG. 1A shows an exploded, top view of flush assembly 100, according to one embodiment. Sprayer body 101 has bottom wall 102, front wall 103, and rear wall 104. Sprayer body 101 comprises an arc shape, wherein rear wall 104 has a curved convex shape configured to conform to a curved concave shape of a urinal wall. Sprayer body 101 may be considered to have a curved-window-box-like shape. First outlet 105 has a curved slot, arc shape, and is substantially centered along a length of bottom wall 102. Rear wall 104 contains inlet port 106, in fluid communication with source water inlet 107. Inlet port 106 is substantially centered along a length of rear wall 104. Source water inlet 107 is configured to be coupled to a water source via a hose (not shown). In this embodiment, first outlet 105 has a width of about 1.5 mm and a length of about 61 mm, to provide an opening area of about 91.5 $mm^2$.

First outlet 105 and inlet port 106 are disposed in sprayer body chamber 108, chamber 108 being defined by walls 102, 103, and 104. Chamber 108 in this embodiment is defined lengthwise by stops 109. Gasket 110 is configured to couple to the top of spray body 101 and form a seal with stops 109. Thus, chamber 108 is defined by walls, 102, 103, and 104 and by stops 109 and gasket 110. Chamber 108 comprises a depth of about 13.5 mm. Bottom wall 102 further comprises second slot-shaped outlet 111, and third slot-shaped outlet 112 positioned on opposing ends of first outlet 105. Second and third outlets 111 and 112 are substantially equidistant from and in alignment with first outlet 105 along bottom wall 102. Second and third outlets 111 and 112 are substantially a continuation of the arc shape of first outlet 105, in other words, first, second, and third outlets 105, 111 and 112 are a continuous arc shape interrupted by portions of bottom wall 102. In this embodiment, second and third outlets 111 and 112 have a width of about 1.5 mm, a length of about 12 mm, and an area of about 18 $mm^2$.

Chamber 108 contains baffles 113. A bottom surface of gasket 110 does not form a seal with baffles 113, thus source water is in fluid communication with outlets 111 and 112. Baffles 113 are positioned between first outlet 105 and second outlet 111, and between first outlet 105 and third outlet 112. Baffles 113 are configured to modulate fluid flow through outlets 111 and 112 during a flush cycle.

Also shown in FIG. 1A is attachment/inlet portion 118. Attachment/inlet portion 118 comprises shim gasket 114, shim 115, nut 116, and source water inlet 107, which components will be positioned behind a urinal wall upon installation of flush assembly 100 in a urinal. Sprayer body 101 will be positioned in front of and on a urinal wall upon installation.

Figure 1B:
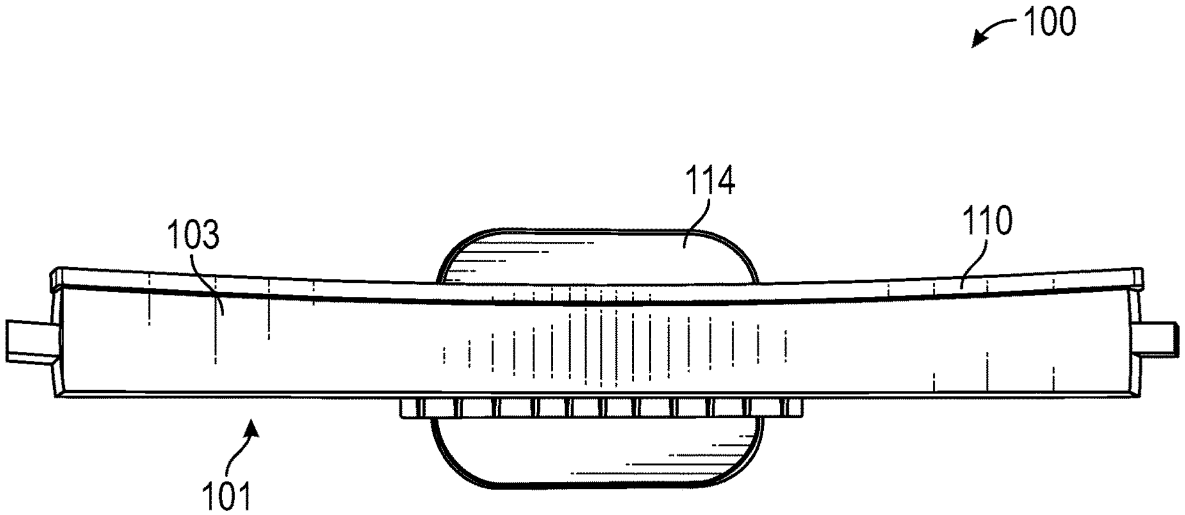
FIG. 1B provides a front view of a flush assembly, according to an embodiment.

FIG. 1B provides a front view of flush assembly 100, according to an embodiment. Visible from the front are front wall 103 of sprayer body 101. Gasket 110 is coupled to the top of sprayer body 101. Visible also is shim gasket 114.

Figure 1C:
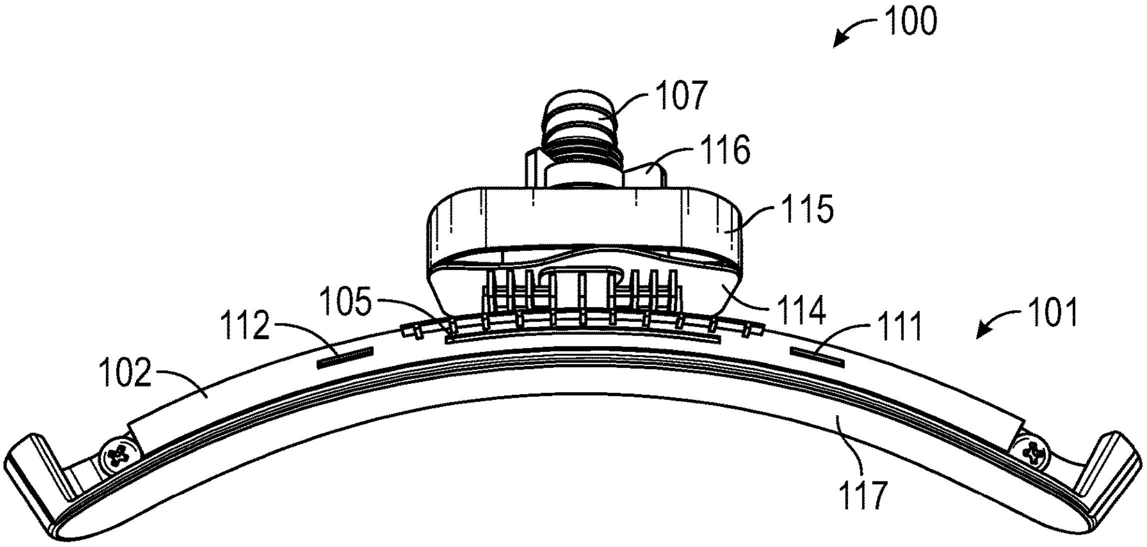
FIG. 1C provides a bottom view of a flush assembly, according to an embodiment.

FIG. 1C provides a bottom view of flush assembly 100, according to an embodiment. Shown are first outlet 105, second outlet 111, and third outlet 112, positioned in bottom wall 102 of sprayer body 101. Visible are shim gasket 114, shim 115, nut 116, and source water inlet 107. Sprayer body 101 is coupled to face plate 117.

Figure 1D:
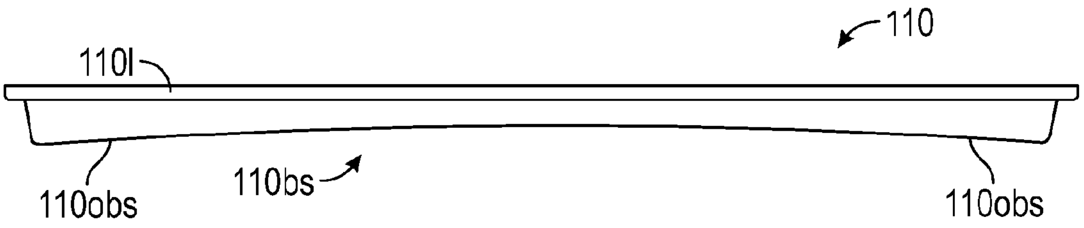
FIG. 1D shows a gasket of a flush assembly, according to an embodiment.

FIG. 1D provides a front view of gasket 110, according to an embodiment. Gasket 110 comprises curved bottom surface 110*bs*, such that outer bottom surfaces 110*obs* form a seal with sprayer body bottom wall 102. Gasket bottom surface 110*bs* does not form a seal with baffles 113, such that a space exists between gasket bottom surface 110*bs* and a top of baffles 113, allowing for fluid flow towards and through outlets 111 and 112. Gasket bottom surface 110*bs* does form a seal with stops 109 such that fluid flow is not permitted beyond stops 109. Gasket 110 comprises lip 1101 around a perimeter thereof for forming a seal around a top of front wall 103, rear wall 104 and the side edges of body 101.

Figure 2:
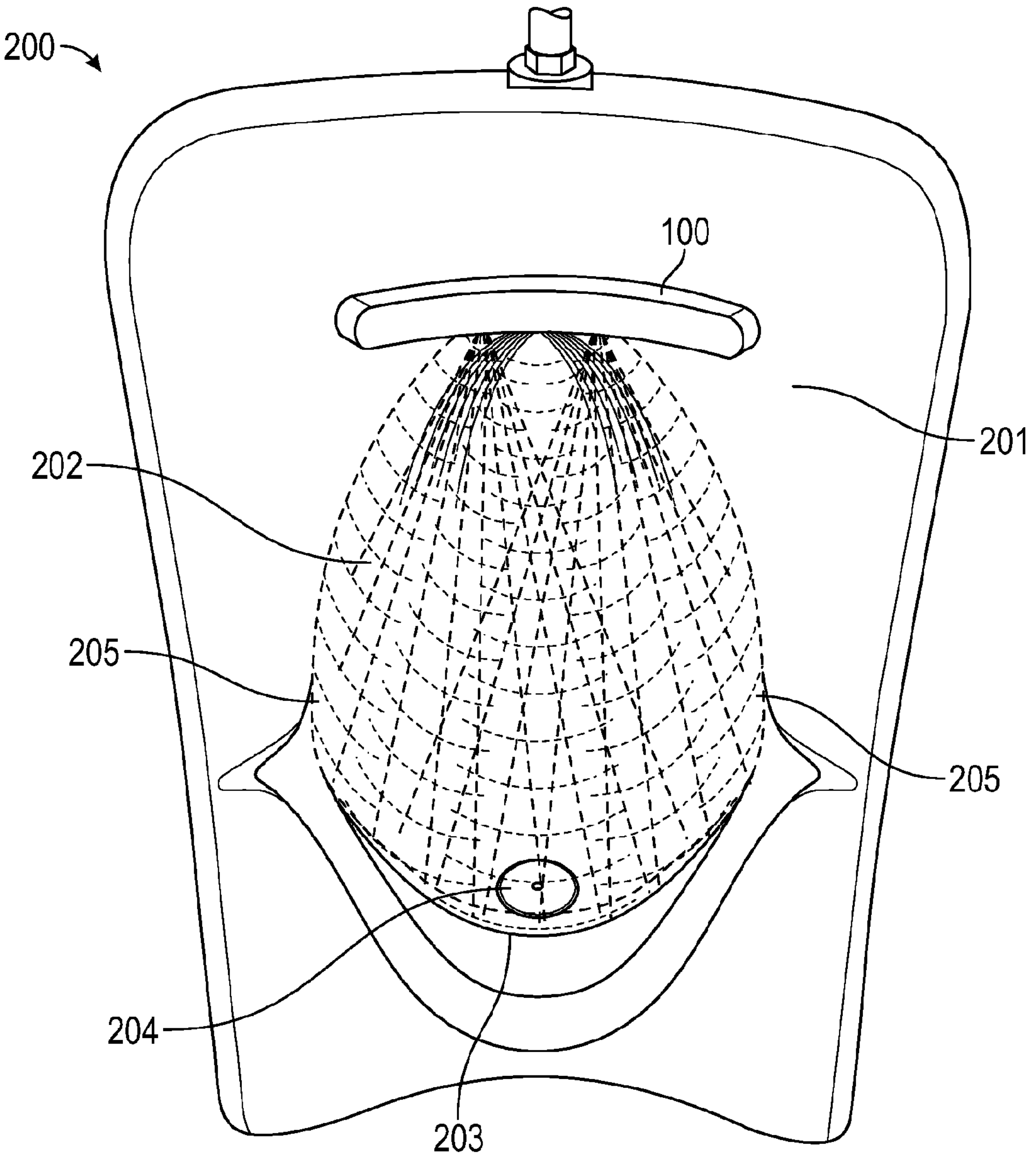
FIG. 2 shows a flush profile of a flush assembly in a urinal, according to an embodiment.

FIG. 2 shows urinal 200, according to an embodiment. Flush assembly 100 is coupled to an upper portion of concave urinal wall 201 and conforms to and mates with concave wall 201. Visible is flush profile 202 of dyed flush water from a water source during a flush cycle. As seen from flush profile 202, flush water flows into basin 203 in a continuous flow and completely surrounds drain 204. Continuous flow profile 202 is greater than 200 mm wide at widest point 205, and is wider than flush assembly 100 at widest point 205. Continuous flush profile 202 is about 1400 $cm^2$ in total area. Flush water does not spill over or out of basin 203 during a flush cycle. First outlet 105 directs flush water towards outer edges of urinal wall 201, while second outlet 111 and third outlet 112 direct flush water in a substantially vertical flow path down wall 201. The flow paths combine and interfere with each other, providing continuous flush profile 202.

In some embodiments, a sprayer body may be coupled to a source water inlet configured to be in fluid communication with a source water and comprises one or more water outlets (openings) configured to be in fluid communication with a plumbing fixture, for example with a wall and a basin of a plumbing fixture. A source water fluid inlet may be coupled to a water source via a hose. In some embodiments, a sprayer body may comprise a sprayer body chamber comprising a water inlet port and one or more sprayer body fluid outlets. A sprayer body water inlet port may be in fluid communication with a source water inlet and the chamber. In some embodiments, during a flush cycle, source water will enter a sprayer body chamber through an inlet port and be discharged from a sprayer body chamber to the plumbing fixture via the one or more outlets.

In some embodiments, a sprayer body may comprise a rectangular box-like shape, not unlike a window box. In some embodiments, a sprayer body may comprise a curved-rectangular-box-like shape or curved-window-box-like shape, for instance having an arc shape. A sprayer body may comprise a bottom wall, a rear wall, and a front wall. A sprayer body may comprise side walls on a left and right side. In some embodiments, a sprayer body may comprise a shape substantially corresponding to a shape of a plumbing fixture wall to which it may be attached. In other embodiments, a sprayer body may comprise a shape different than that of a plumbing fixture wall to which it may be attached. In some embodiments, a sprayer body rear wall may comprise a shape corresponding to a shape of a plumbing fixture wall to which it may be attached. In some embodiments, a sprayer body rear wall comprises a curved convex shape configured to correspond to and mate with a curved concave portion of a plumbing fixture wall to which it may be attached.

In some embodiments, a bottom wall, rear wall, and front wall may be a continuous wall, which may or may not have one or more sharp box-like edges. For instance, edges may be rounded. In other embodiments, a sprayer body may have a basket- or bowl-like shape, and still be considered to have a bottom wall, a rear wall, and a front wall, wherein the walls are "sections" of a continuous bowl-like wall.

In some embodiments, a sprayer body chamber may have a depth of from any of about 5.0 mm, about 5.5 mm, about 6.0 mm, about 6.5 mm, about 7.0 mm, about 7.5 mm, about 8.0 mm, about 8.5 mm, or about 9.0 mm, to any of about 9.5 mm, about 10.0 mm, about 10.5 mm, about 11.0 mm, about 11.5 mm, about 12.0 mm, about 12.5 mm, about 13.0 mm, about 13.5 mm, about 14.0 mm, about 14.5 mm, about 15.0 mm, about 15.5 mm, about 16.0 mm, about 16.5 mm, about 17.0 mm, about 17.5 mm, about 18.0 mm, about 18.5 mm, about 19.0 mm, about 19.5 mm, about 20.0 mm, about 20.5 mm, about 21.0 mm, about 21.5 mm, about 22.0 mm, about 22.5 mm, or more. A sprayer body chamber depth may be measured from a top edge of a front or rear wall to a chamber bottom inner surface.

In some embodiments, an open top section of a sprayer body may be coupled to a gasket. In some embodiments, a sprayer body chamber is defined by a sprayer body bottom wall, rear wall, front wall, and gasket. A sprayer body chamber bay be in fluid communication with one or more outlets and an inlet port.

In some embodiments, a bottom wall comprises a first outlet substantially centered along a length of the bottom wall. In some embodiments, an inlet port may be positioned in a rear wall of a sprayer body and substantially centered along a length of the sprayer body. In some embodiments, a first outlet may comprise a shape substantially corresponding to a shape of the sprayer body bottom wall. In some embodiments, a first outlet may comprise an arc shape.

In some embodiments, a first outlet may comprise a slot shape or a curved slot shape. In some embodiments, a first outlet may comprise a width of from any of about 0.5 mm, about 0.7 mm, about 0.9 mm, about 1.1 mm, about 1.3 mm, about 1.5 mm, about 1.7 mm, or about 1.9 mm to any of about 2.1 mm, about 2.3 mm, about 2.5 mm, or more. In some embodiments, a first outlet may have a length of from any of about 25 mm, about 30 mm, about 35 mm, about 40 mm, about 45 mm, about 50 mm, about 55 mm, about 60 mm, or about 65 mm, to any of about 70 mm, about 75 mm, about 80 mm, about 85 mm, about 90 mm, or more. In some embodiments, a first outlet may comprise a total opening area of from any of about 70 $mm^2$, about 75 $mm^2$, about 80 $mm^2$, about 85 $mm^2$, about 90 $mm^2$, about 95 $mm^2$, or about 100 $mm^2$, to any of about 105 $mm^2$, about 110 $mm^2$, or about 115 $mm^2$, or more.

In the case of a curved slot shape, a length refers to the total length, for example a total arc length. A width may be measured at any one point. In general, a slot shape may comprise a substantially uniform width over its length.

In some embodiments, a sprayer body chamber may comprise a first outlet and a second outlet. In some embodiments, a sprayer body may comprise a first outlet and a second outlet having substantially a same size and opening area. A first and a second outlet may be positioned along a length of a sprayer body bottom wall, so that a left and a right side of the bottom wall are substantially mirror images of each other.

In some embodiments, a second outlet may be, or appear as, substantially a continuation of the first outlet interrupted by a portion of the bottom wall. In this embodiment, a second outlet may be aligned with the first outlet across a width of the bottom wall. For example, a first outlet may have an arc shape, and a second outlet may appear as a continuation of the first outlet arc shape, being interrupted by a portion of the bottom wall.

In some embodiments, a sprayer body may comprise a second outlet and a third outlet. In some embodiments, a second and a third outlet may be positioned in a bottom wall on either side of a first outlet. A second and a third outlet may be positioned substantially equidistant from a first outlet. In some embodiments, a second and a third outlet may be aligned with a first outlet, for example, aligned across a width of a bottom wall. In other embodiments, a second and a third outlet may not be aligned with a first outlet across a width of a bottom wall, but may be spaced from a first outlet across a width of a bottom wall. In some embodiments, first, second, and third outlets may be positioned in a bottom wall so that a left and a right side of the bottom wall are substantially mirror images of each other.

In some embodiments, second and third outlets may be, or appear as, substantially a continuation of the first outlet interrupted by portions of the bottom wall. In this embodiment, second and third outlets are aligned with the first outlet across a width of the bottom wall. For example, a first outlet may have an arc shape, and a second and a third outlet may appear as a continuation of the first outlet arc shape, being interrupted by portions of the bottom wall.

In some embodiments, second and third outlets may comprise a width of from any of about 0.5 mm, about 0.7 mm, about 0.9 mm, about 1.1 mm, about 1.3 mm, about 1.5 mm, about 1.7 mm, or about 1.9 mm to any of about 2.1 mm, about 2.3 mm, about 2.5 mm, or more. In some embodiments, a second and third outlets may have a length of from any of about 5 mm, about 6 mm, about 7 mm, about 8 mm, about 9 mm, or about 10 mm, to any of about 11 mm, about 12 mm, about 13 mm, about 14 mm, about 15 mm, about 16 mm, about 17 mm, about 18 mm, about 19 mm, about 20 mm, or more. In some embodiments, second and third outlets may comprise a total opening area of from any of about 8 $mm^2$, about 10 $mm^2$, about 12 $mm^2$, about 14 $mm^2$, about 16 $mm^2$, about 18 $mm^2$, or about 20 $mm^2$, to any of about 22 $mm^2$, about 24 $mm^2$, about 26 $mm^2$, or about 28 $mm^2$, or more.

In some embodiments, a first outlet, a second outlet, a third outlet, and one or more further outlets may have a length of from any of about 5 mm, about 6 mm, about 7 mm, about 8 mm, about 9 mm, or about 10 mm, to any of about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, or more. In some embodiments, a first outlet, a second outlet, a third outlet, and one or more further outlets may have a length of from any of about 25 mm, about 30 mm, about 35 mm, about 40 mm, about 45 mm, about 50 mm, about 55 mm, about 60 mm, or about 65 mm, to any of about 70 mm, about 75 mm, about 80 mm, about 85 mm, about 90 mm, or more.

In some embodiments, first, second and third outlets may comprise substantially a same length, width, and opening area. In other embodiments, a first outlet is larger than a second and a third outlet. In some embodiments, a first outlet opening may be from any of about 2 times, about 3 times, about 4 times, or about 5 times, to any of about 6 times, about 7 times or about 8 times larger than second and third outlet openings, by area. In other embodiments, a second and third outlet openings may be larger than a first outlet opening, for example by the same or similar ratios.

In some embodiments, a sprayer body chamber may comprise one or more baffles, for example two or more baffles, configured to direct and modulate flush water out of the chamber through the one or more outlets in a desired flow path and/or pattern. For example an outlet may comprise a baffle positioned on either side of it on the bottom wall. In another embodiment, a bottom wall may comprise a first outlet and a second outlet, wherein a baffle is present at an outer edge of each opening. In some embodiments, a bottom wall having a first and second outlet may have a baffle in between the outlets and one at each opening outer edge (3 baffles). In yet another embodiment, a bottom wall having a first outlet, a second outlet, and a third outlet may have a baffle on either side of the first outlet, which may be configured to direct and modulate fluid flow through the second and third outlets.

In some embodiments, a sprayer body having an open top section (like a window box), may be coupled to a gasket, the gasket being at least partially disposed in a sprayer body chamber. A gasket may form a seal with bottom wall outer sections of a chamber (where no outlets are present). In some embodiments, a gasket is configured to not form a seal with one or more baffles, so that flush water may flow over a top of a baffle towards an outlet. In other words, a chamber may comprise individual chambers separated by baffles, the individual chambers fluidly connected via a space between a top of a baffle and a bottom of a gasket.

A present plumbing fixture may be coupled to a flush valve, which flush valve may be manually operated or automatically operated, for example via use of a presence sensor. A flush cycle may be defined as from when a flush valve is actuated to initiate fluid flow into the flush assembly, then stopped to stop fluid flow to the flush assembly (a flush).

In some embodiments, during a flush cycle, flush water will form a continuous flow profile on the plumbing fixture wall. Continuous flow profile meaning a substantially unbroken surface, film, or path of water on a plumbing fixture wall, that is, an entire section of wall is substantially completely covered with water during a flush cycle. In some embodiments, during a flush cycle, a present sprayer body may provide a continuous flow profile on the plumbing fixture wall into a plumbing fixture basin and surround a drain.

In certain embodiments, a continuous flow profile may be from any of about 150 mm, about 160 mm, about 170 mm, about 180 mm, or about 190 mm, to any of about 200 mm, about 210 mm, about 220 mm, about 230 mm, about 240 mm, about 250 mm, or more, at a widest point. In some embodiments, a continuous flow profile may be wider than the sprayer body at a flow profile widest point.

In some embodiments, a continuous flow profile may have a total area of from any of about 1000 $cm^2$, about 1100 $cm^2$, about 1200 $cm^2$, or about 1200 $cm^2$, to any of about 1300 $cm^2$, about 1400 $cm^2$, about 1500 $cm^2$, about 1600 $cm^2$, about 1700 $cm^2$, about 1800 $cm^2$, or more.

A continuous flow profile may be achieved regardless of flush volume. For example, in some embodiments, a continuous flow profile may be achieved for a flush volume during a flush cycle of from a pint to a gallon. For instance, from any of about 0.10 gal, about 0.12 gal, about 0.13 gal, about 0.15 gal, about 0.17 gal, about 0.20 gal, about 0.25 gal, about 0.30 gal, about 0.35 gal, or about 0.40 gal, to any of about 0.45 gal, about 0.50 gal, about 0.55 gal, about 0.60 gal, about 0.65 gal, about 0.70 gal, about 0.75 gal, about 0.80 gal, about 0.85 gal, about 0.90 gal, about 0.95 gal, or about 1.00 gal.

A large area, continuous flow profile is highly desirable towards providing a clean plumbing fixture over many uses. A present flush assembly provides a large area flow profile without flush water spilling over and out of a basin during a flush cycle. Municipal water lines may have varied water pressures, thus, a present flush assembly may be coupled to a water pressure adjustment screw in order to adjust the flush flow profile.

In some embodiments, the flush assembly may contain no spray nozzles.

According to the disclosure, an arc shape may be segment of a circle, and also includes other "curved line" shapes, for instance portions of other shapes including ellipse, oval, oblong, ovate, obovate, cuneate, deltoid, orbicular, and others.

Following are certain non-limiting embodiments of the disclosure.

In a first embodiment, disclosed is a flush assembly for a plumbing fixture, the assembly comprising a sprayer body, wherein the sprayer body comprises a bottom wall, a front wall, and a rear wall, the sprayer body is configured to be in fluid communication with a source water, and the sprayer body bottom wall comprises a first outlet through which flush water is delivered during a flush cycle.

In a second embodiment, disclosed is a flush assembly according to the first embodiment, wherein the sprayer body is configured to couple to a portion of a wall of the plumbing fixture, and wherein the sprayer body comprises a shape configured to substantially conform to a shape of the plumbing fixture wall portion.

In a third embodiment, disclosed is a flush assembly according to the second embodiment, wherein the sprayer body rear wall comprises a curved convex shape configured to substantially conform to a curved concave shape of the plumbing fixture wall portion.

In a fourth embodiment, disclosed is a flush assembly according to the second or third embodiments, wherein the first outlet comprises a shape substantially corresponding to the sprayer body shape. In a fifth embodiment, disclosed is a flush assembly according to any of the preceding embodiments, wherein the sprayer body substantially comprises an arc shape.

In a sixth embodiment, disclosed is a flush assembly according to any of the preceding embodiments, wherein the first outlet comprises a slot shape having a length and a width. In a seventh embodiment, disclosed is a flush assembly according to any of the preceding embodiments, wherein the first outlet substantially comprises an arc shape.

In an eighth embodiment, disclosed is a flush assembly according to any of the preceding embodiments, wherein the sprayer body comprises an inlet port in fluid communication with the water source. In a ninth embodiment, disclosed is a flush assembly according to any of the preceding embodiments, wherein the sprayer body comprises an inlet port in fluid communication with the water source, wherein the inlet port is positioned in the sprayer body rear wall, and is substantially centered along a length of the rear wall.

In a tenth embodiment, disclosed is a flush assembly according to any of the preceding embodiments, wherein the first outlet is substantially centered along a length of the bottom wall. In an eleventh embodiment, disclosed is a flush assembly according to any of the preceding embodiments, wherein the first outlet has a width of from about 0.5 mm to about 2.5 mm. In a twelfth embodiment, disclosed is a flush assembly according to any of the preceding embodiments, wherein the first outlet has a length of from about 40 mm to about 90 mm. In a thirteenth embodiment, disclosed is a flush assembly according to any of the preceding embodiments, wherein the first outlet has an area of from about 70 $mm^2$ to about 111 $mm^2$.

In a fourteenth embodiment, disclosed is a flush assembly according to any of the preceding embodiments, wherein the sprayer body walls define a sprayer body chamber configured to be in fluid communication with the water source and with the first outlet. In a fifteenth embodiment, disclosed is a flush assembly according to any of the preceding embodiments, wherein a sprayer body top section is coupled to a gasket, and wherein the walls and gasket define a sprayer body chamber configured to be in fluid communication with the water source and with the first outlet.

In a sixteenth embodiment, disclosed is a flush assembly according to any of the preceding embodiments, wherein the sprayer body bottom wall comprises a second outlet. In a seventeenth embodiment, disclosed is a flush assembly according to embodiment 16, wherein the second outlet is substantially aligned with the first outlet across a width of the bottom wall.

In an eighteenth embodiment, disclosed is a flush assembly according to embodiments 16 or 17, wherein the first outlet and second outlet comprise a baffle positioned therebetween.

In a nineteenth embodiment, disclosed is a flush assembly according to any of embodiments 16 to 18, wherein the second outlet has a slot shape having a length and a width. In a twentieth embodiment, disclosed is a flush assembly according to any of embodiments 16 to 19, wherein the second outlet comprises an arc shape.

In a twenty-first embodiment, disclosed is a flush assembly according to any of embodiments 16 to 20, wherein a left side and a right side of the sprayer body bottom wall are substantially mirror images of each other.

In a twenty-second embodiment, disclosed is a flush assembly according to any of the preceding embodiments, wherein the body bottom wall comprises a second outlet and a third outlet positioned on opposing sides of the first outlet through which flush water is delivered during a flush cycle. In a twenty-third embodiment, disclosed is a flush assembly according to embodiment 22, wherein the second outlet and third outlet are positioned on opposing sides of the first outlet, and wherein the second and third outlets are substantially equidistant from the first outlet.

In a twenty-fourth embodiment, disclosed is a flush assembly according to embodiments 22 or 23, wherein the second and third outlets are aligned with the first outlet along the sprayer body bottom wall. In a twenty-fifth embodiment, disclosed is a flush assembly according to any of embodiments 22 to 24, wherein the second and third outlets comprise a slot shape having a length and a width.

In a twenty-sixth embodiment, disclosed is a flush assembly according to any of embodiments 22 to 25, wherein the second and third outlets have a width of from about 0.5 mm to about 2.5 mm. In a twenty-seventh embodiment, disclosed is a flush assembly according to any of embodiments 22 to 26, wherein the second and third outlets have a length of from about 6 mm to about 18 mm.

In a twenty-eighth embodiment, disclosed is a flush assembly according to any of embodiments 22 to 27, comprising a first baffle and a second baffle positioned on opposing sides of the first outlet, the baffles configured to modulate fluid flow through the outlets during a flush cycle.

In a twenty-ninth embodiment, disclosed is a flush assembly according to any of embodiments 22 to 28, comprising a first baffle positioned between the second outlet and the first outlet, and a second baffle positioned between the third outlet and the first outlet, the baffles configured to modulate fluid flow through the second and third outlets during a flush cycle.

In a thirtieth embodiment, disclosed is a flush assembly according to any of embodiments 22 to 29, wherein the second outlet and third outlet each have an area of from about 9 $mm^2$ to about 27 $mm^2$. In a thirty-first embodiment, disclosed is a flush assembly according to any of embodiments 22 to 30, wherein the first outlet has an area that is from about 3 times to about 7 times larger than an area of the second or third outlet.

In a thirty-second embodiment, disclosed is a flush assembly according to any of the preceding embodiments, wherein the sprayer body is coupled to a water pressure adjustment screw.

In a thirty-third embodiment, disclosed is a plumbing fixture comprising a flush assembly according to any of the preceding embodiments, wherein the flush assembly is coupled to a portion of a wall of a plumbing fixture. In a thirty-fourth embodiment, disclosed is a plumbing fixture according to embodiment 33, wherein the plumbing fixture is a urinal comprising a wall, a basin, and a drain.

In a thirty-fifth embodiment, disclosed is a plumbing fixture according to embodiments 33 or 34, wherein during a flush cycle, flush water forms a continuous flow profile on the plumbing fixture wall. In a thirty-sixth embodiment, disclosed is a plumbing fixture according to any of embodiments 33 to 35, wherein during a flush cycle, flush water forms a continuous flow profile on the plumbing fixture wall and surrounding the drain.

In a thirty-seventh embodiment, disclosed is a plumbing fixture according to any of embodiments 33 to 36, wherein the continuous flow profile comprises a total area of from 1000 $cm^2$ to about 1600 $cm^2$. In a thirty-eighth embodiment, disclosed is a plumbing fixture according to any of embodiments 33 to 37, wherein the continuous flow profile is independent of a flush volume during a flush cycle.

In a thirty-ninth embodiment, disclosed is a flush assembly sprayer body according to any of embodiments 1 to 32. In a fortieth embodiment, disclosed is an assembly comprising a sprayer body according to any of embodiments 1 to 32 and a gasket configured to couple to a sprayer body top section, and wherein the sprayer body walls and gasket define a sprayer body chamber.

Features described in connection with one embodiment of the disclosure may be used in conjunction with other embodiments, even if not explicitly stated above.

The term "coupled" may mean that an element is "attached to" or "associated with" another element. Coupled may mean directly coupled or coupled through one or more other elements. An element may be coupled to an element through two or more other elements in a sequential manner or a non-sequential manner. The term "via" in reference to "via an element" may mean "through" or "by" an element. Coupled or "associated with" may also mean elements not directly or indirectly attached, but that they "go together" in that one may function together with the other.

The term "fluid communication" may be synonymous with "fluidly coupled" or "fluidly connected" or "flow communication" and may mean an element or feature may distribute or receive fluid to or from another element or feature. The term "associated with" may mean "coupled", i.e. "fluidly coupled".

The term "towards" in reference to a of point of attachment or a location, may mean at exactly that location or point or, alternatively, may mean closer to that point or location than to another distinct point or location, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by +0.05%, +0.1%, +0.2%, +0.3%, +0.4%, +0.5%, +1%, +2%, +3%, +4%, +5%, +6%, +7%, +8%, +9%, +10% or more. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more of the definition; for example the term "substantially perpendicular" may mean the 90° perpendicular angle may mean "about 90°". The term "generally" may be equivalent to "substantially".

Embodiments of the disclosure include any and all parts and/or portions of the embodiments, claims, description and figures. Embodiments of the disclosure also include any and all combinations and/or sub-combinations of embodiments.

The invention claimed is:

1. A flush assembly for a plumbing fixture, the assembly comprising a sprayer body, wherein the sprayer body comprises a bottom wall, a front wall, and a rear wall, the sprayer body is configured to be in fluid communication with a water source, the sprayer body comprises a first outlet, a second outlet, and a third outlet positioned along the sprayer body bottom wall, through which flush water is delivered during a flush cycle, the second outlet and the third outlet are positioned on opposing sides of the first outlet, the first outlet comprises a slot shape having a length and a width, the first outlet length substantially centered along a length of the bottom wall, the sprayer body is configured to couple to a portion of a wall of the plumbing fixture, the sprayer body comprises a shape configured to substantially conform to a shape of the plumbing fixture wall portion, the sprayer body comprises a chamber configured to be in fluid communication with the water source, the chamber is in fluid communication with the first outlet, the second outlet, and the third outlet, the first outlet, the second outlet, and the third outlet are the only openings positioned along the sprayer body bottom wall through which flush water is delivered during a flush cycle, wherein the first outlet directs water towards outer edges while the second and third outlets direct water in a substantially vertical flow path, wherein the flow paths combine and interfere with each other to form a continuous flow profile.

2. The flush assembly according to claim 1, wherein the sprayer body rear wall comprises a curved convex shape configured to substantially conform to a curved concave shape of the plumbing fixture wall portion.

3. The flush assembly according to claim 1, wherein the first outlet comprises a shape substantially corresponding to the sprayer body shape.

4. The flush assembly according to claim 1, wherein the sprayer body substantially comprises an arc shape.

5. The flush assembly according to claim 1, wherein the first outlet has a width of from about 0.5 mm to about 2.5 mm and a length of from about 40 mm to about 90 mm.

6. The flush assembly according to claim 1, wherein a sprayer body top is coupled to a gasket, and wherein the bottom wall, front wall, rear wall, and gasket define the sprayer body chamber.

7. The flush assembly according to claim 6, wherein the second outlet and third outlet each comprise a slot shape having a length and a width.

8. The flush assembly according to claim 7, wherein the second outlet and third outlet are positioned on opposing sides of the first outlet, and wherein the second and third outlets are substantially equidistant from the first outlet.

9. The flush assembly according to claim 7, wherein the sprayer body comprises an arc shape, and wherein the first, second, and third outlets comprise an arc shape substantially corresponding to the sprayer body shape.

10. The flush assembly according to claim 9, wherein the second and third outlets are substantially aligned with the first outlet along the sprayer body bottom wall.

11. The flush assembly according to claim 7, wherein the first outlet has an area that is from about 3 times to about 7 times larger than an area of the second or third outlet.

12. The flush assembly according to claim 7, wherein the width of the second and third outlets is from about 0.5 mm to about 2.5 mm, and the length of the second and third outlets is from about 6 mm to about 18 mm.

13. The flush assembly according to claim 7, wherein the chamber comprises a first baffle positioned between the first outlet and the second outlet and a second baffle positioned between the first outlet and the third outlet, the baffles are configured to modulate fluid flow through the outlets during a flush cycle, and the baffles do not form a seal with the gasket.

14. The flush assembly according to claim 1, wherein the sprayer body is coupled to a water pressure adjustment screw.

15. A plumbing fixture comprising a flush assembly according to claim 1, wherein the flush assembly is coupled to a portion of a wall of the plumbing fixture.

16. The plumbing fixture according to claim 15, wherein the plumbing fixture is a urinal comprising a wall, a basin, and a drain.

17. The plumbing fixture according to claim 16, wherein during a flush cycle, flush water forms a continuous flow profile on the urinal wall and surrounding the drain.

18. The plumbing fixture according to claim 17, wherein the continuous flow profile comprises a total area of from 1000 $cm^2$ to about 1600 $cm^2$.

19. The plumbing fixture according to claim 17, wherein the continuous flow profile is independent of a flush volume during a flush cycle.

20. A flush assembly sprayer body according to claim 1.

* * * * *